Figure 3:
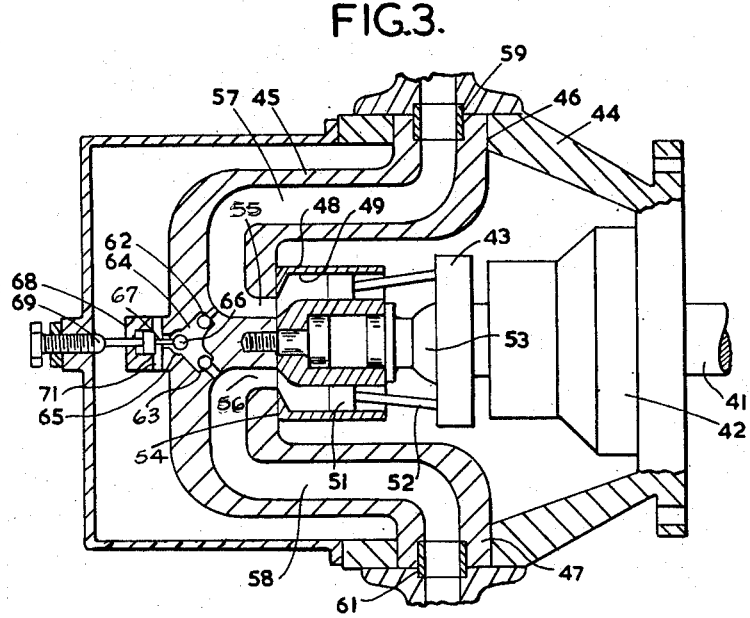

Dec. 15, 1964   O. THOMA ETAL   3,161,137
HYDRAULIC APPARATUS
Filed June 12, 1962   2 Sheets-Sheet 1
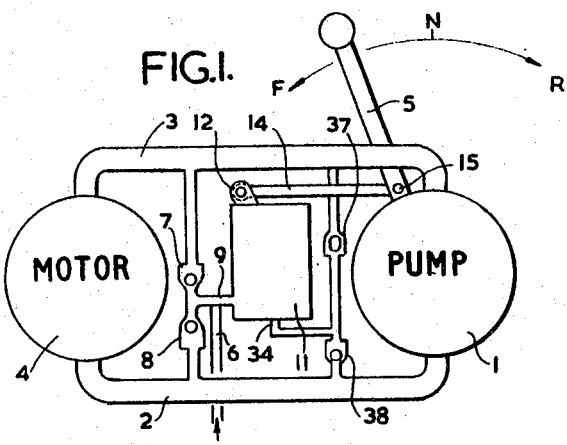
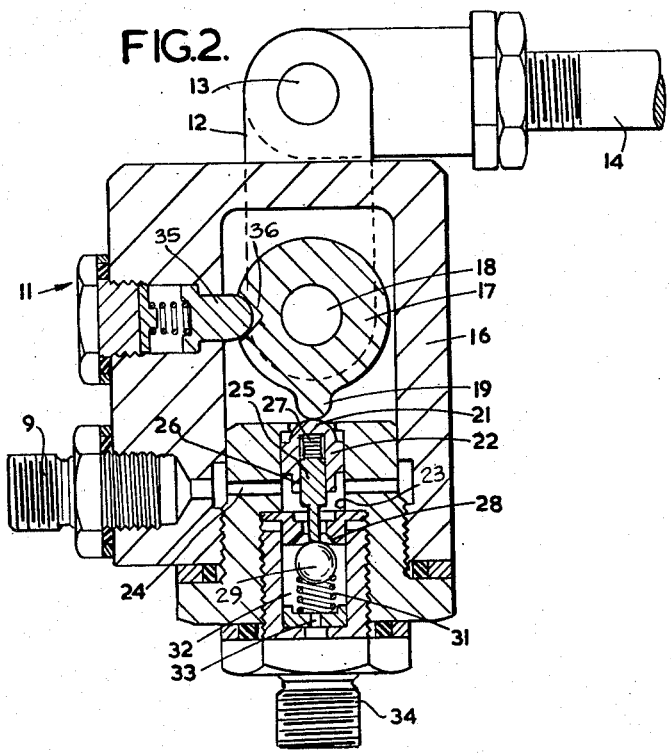
INVENTORS
OSWALD THOMA
KENNETH R. BOYDELL
BERTRAM CARL KEMPSON
BY Reynolds + Christensen
ATTORNEYS United States Patent Office 3,161,137
Patented Dec. 15, 1964

3,161,137
HYDRAULIC APPARATUS
Oswald Thoma, Charlton Kings, Kenneth Raymond Boydell, Bredons Hardwicke, near Tewkesbury, and Bertram Carl Kempson, St. Marks, Cheltenham, England, assignors to Dowty Hydraulic Units Limited, Ashchurch, England, a British company, and Unipat A.G., Glarus, Switzerland, a Swiss company
Filed June 12, 1962, Ser. No. 202,015
Claims priority, application Great Britain, June 12, 1961, 21,137/61
9 Claims. (Cl. 103—41)

This invention relates to hydraulic apparatus and is more particularly concerned with hydraulic pumps of the infinitely variable positive displacement type capable of infinite displacement variation within a range of displacement values. For some uses of such pumps the difficulty often arises that it is necessary to be able to select zero displacement of the pump with accuracy to ensure zero delivery of the pump. This problem is more acute with reversible infinitely variable positive displacement pumps where the displacement change from forward to reverse is by smooth movement of the control through a neutral position. It has been proposed to provide a valve which opens to provide a substantially unrestricted by-pass passageg between inlet and outlet connections when the pump displacement is adjusted to within a predetermined small range of movement about the neutral displacement position. However, for a number of possible uses of such pumps, such for example as driving the cable winding drum of a crane or propelling a vehicle it is a definite disadvantage when zero displacement is selected for there to be effectively a completely unrestricted by-pass across the pump since this means that the hydraulic motor driven by the pump is able to rotate freely without restriction. In the case of a crane lifting a load this means that when zero displacement of pump is selected the load will fall without restriction, or in the case of a vehicle when zero displacement is selected there will be no brake imposed on the vehicle by the transmission. The object of the invention is to reduce such difficulties in the hydrostatic transmission.

In accordance with the invention a hydraulic pump of infinitely variable positive displacement is provided with a vent valve connected with the pump high pressure connection and adapted to open over a small displacement range which includes the zero displacement position, such valve when opening permitting restricted flow only of liquid. In this way a motor connected to be driven by the pump will not be able to rotate freely when the zero displacement position of a pump is selected. At or near the zero displacement position of the pump a restricted flow of liquid from the pump high pressure connection only is necessary to by-pass the liquid delivered by the pump without generating any substantial pressure.

Two examples of the invention will now be described with reference to the accompanying drawings, in which
FIGURE 1 is a diagrammatic illustration of a hydrostatic power transmission incorporating the invention,
FIGURE 2 is a cross-section of the vent valve shown in block form in FIGURE 1, and
FIGURE 3 is a cross-section through a variable displacement hydraulic pump in which a vent valve is incorporated in accordance with the invention.

Referring initially to FIGURE 1 of the drawings a hydrostatic transmission is illustrated comprising an infinitely variable reversible displacement pump 1 hydraulically connected through pipes 2 and 3 with a fixed positive displacement motor 4. Such a transmission may be used for example on a vehicle, the pump 1 being driven by the vehicle engine and the motor 4 being connected to drive the ground engaging wheels. The pump 1 includes a displacement adjusting handle 5 adjustable over a range of positions from forward displacement through neutral displacement to reverse displacement, such displacement adjustment being effected smoothly. The transmission includes a make-up pump (not shown) driven by the engine feeding into one or the other of the pipelines 2 or 3 through a pipe 6 and one or other of the non-return valves 7 or 8. The pipe 6 also is connected to the connector 9 or a valve unit 11 which is shown more clearly in FIGURE 2. The vent valve includes an operating lever 12 pivotally connected by a pivot 13 to a link 14 which at its opposite end is pivotally connected at 15 to displacement adjusting lever 5.

The vent valve 11 comprises a casing 16 within which a cam 17 is rotatably mounted on a spindle 18 to which the lever 12 is fixed externally of the unit. The cam 17 includes a lobe 19 which co-operates with the rounded end 21 of plunger 22 slidably located within a bore 23. The connection 9 connects to a passage 24 within the body 16 which opens into the bore 23. Within the plunger 22 an auxiliary plunger 25 is located for sliding movement in a bore 26, a helical coil compression spring 27 being trapped within the bore 26 to act on the auxiliary plunger 25. The plunger 25 projects from the plunger 22 through a valve seating 28 for engagement with a ball valve member 29. A spring 31 normally acts to urge the ball valve member 29 onto the seat 28. The ball valve member 29 is located in a valve chamber 32 from which a passage 33 extends to a connection 34. Also within the body of the valve a spring loaded plunger 35 is located for engagement with a notch or recess 36 in the cam 17, the plunger 35 being adapted to engage recess 36 at the same time as the lobe 19 engages the plunger 21.

The connection 34 externally of the unit 11 is connected intermediate a pair of non-return valves 37 and 38 that are connected to the transmission pipes 3 and 2 respectively, such that the higher pressure in the pipes 2 or 3 will enter the connection 34.

In operation of the transmission to propel the vehicle, the pump 1 will work at a substantial displacement to cause liquid to be delivered to the motor 4 through either of the pipes 2 or 3, depending upon the intended direction of drive, to cause the motor to drive the vehicle in the appropriate direction. For braking the vehicle the displacement control lever 5 is moved back towards the neutral or zero position in which case the inertia of the vehicle will cause the motor to act as a pump to deliver liquid into the pump 1 causing it to drive the engine which will then operate to dissipate the energy of the vehicle. When the lever 5 gets close to the neutral position of the pump the lobe 19 of cam 17 will engage the plunger 22, depressing it and causing a load to be applied to the plunger 25 through spring 27 against the ball 29. Since the pressure in whichever of the pipes 2 and 3 is at the higher pressure acts on the ball 29 to urge it on to its seat it will be clear that the plunger 25 will not unseat the ball 29 until the pressure behind the ball 29 drops to a comparatively low value, sufficient that the force of spring 27 can overcome the resisting pressure. The coils of the spring 27 tend to close so that it transmits a substantially increased force from the lobe 19 when the cam 17 occupies a position corresponding to zero displacement position of the pump. When the valve 29 is unseated liquid flows from the higher pressure pipe 2 or 3 through one or the other of the non-return valves 37 or 38 through the valve seating 28 and into the pipe 9 to the lower pressure pipe 2 or 3 through one or the other of the valves 7 or 8. The seating 28 is arranged to be very little larger in cross-section than the portion of the plunger 25 which projects through it, thus forming a restriction on flow when the valve 29 is unseated. Thus if the vehicle has been brought to a standstill on an incline and the pump displacement lever 5 has been moved approximately to the zero displacement position to open the valve 29 the tendency of the vehicle to run down the slope will cause the motor 4 to displace liquid. Such liquid will not be able to pass through the pump 1 because the latter is substantially at zero displacement and it will tend to pass through the by-pass between the transmission pipes 2 and 3 formed by lifting of valve 29 from the seat 28. The flow rate, however, will be very restricted, with the result that the vehicle will only be able to move at a very slow rate down the slope. This will give sufficient opportunity for the driver to take any appropriate action to ensure that the vehicle can not move further. Such action could comprise the applying of a friction brake or the application of chocks under the vehicle wheels to prevent movement. The plunger 35 in engaging the recess 36 will help to cause the cam 17 and the lever 5 to locate accurately in the neutral displacement position of the pump, thus ensuring a minimum of loading on the engine if it is to be left running. A substantial flow through the vent valve will produce a force on ball 29 tending to seat it. Such a flow could result either from an increase in pump displacement or movement of the motor.

Reference is now made to FIGURE 3 of the accompanying drawings. This drawing illustrates a variable positive displacement hydraulic pump, such as the pump 1 in FIGURE 1, forming part of a hydrostatic power transmission. In this pump a drive shaft 41 carried in a bearing housing 42 has integrally formed therewith a drive flange 43 within the pump casing 44. Also within the pump casing a yoke 45 is carired by trunnion bearings 46 and 47 for pivotal movement about an axis transverse to the rotating axis of the shaft 41. The yoke 45 carries a rotary cylinder barrel 48 having axially directed cylinders 49 within which pistons 51 are reciprocably located. These pistons are connected by connecting rods 52 to the drive flange 43. A universal joint 53 interconnects the drive flange with the cylinder block 48 so that they rotate at the same angular velocity.

The cylinder block 48 is carried rotatably within the yoke 45 on a distributor valve 54 having a pair of ports 55 and 56, one of which carries supply liquid and the other return liquid. These ports are connected to passages 57 and 58 within the yoke 45 and extend through rotary connections 59 and 61 in the trunnion bearings 46 and 47.

Within the yoke at a position remote from the drive flange 43 a pair of non-return valves 62 and 63, corresponding to valves 37, 38, extend from the passages 57 and 58 to deliver liquid into a space 64. Liquid may leave the space 64 through a valve seating 65 on which a ball 66 is adapted to seat. A plunger 67 slidably carried in an extension 68 of the yoke is capable of engaging the ball 66 to unseat it. The plunger 67 is moved to unseat ball 66 against the force of a spring (not shown) similar to spring 31 when it makes contact with a fixed cam 69 carried in the pump casing 44. It is so arranged that plunger 67 engages cam 69 to lift the ball valve 66 at the zero displacement position of the yoke 45 and for a matter of one or two degrees of movement of the yoke on either side of the zero displacement position. When valve 66 is lifted liquid from the passage 57 or 58 at higher pressure will pass through the seating 65 and through a passage 71 into the interior of the pump casing which is connected to a hydraulic liquid reservoir at substantially zero pressure. Thus at or near the zero displacement position of the pump high pressure liquid generated within the pump is vented through a restrictor formed by the seating 65 to the hydraulic reservoir. As explained in respect of FIGURES 1 and 2 the restrictor will prevent any substantial unloading so that liquid displaced by a motor connected to the pump can flow in a limited manner only through the seating 65 thus preventing free movement of the motor.

We claim as our invention:

1. In combination with a hydraulic pump of the infinitely variable positive displacement type, means to adjust the pump's displacement through a range including zero displacement, a high pressure delivery duct leading from said pump, a normally closed vent valve having a small displacement range when open, operatively interposed between said high pressure duct and a low pressure region, and means operatively connected to said displacement adjusting means, and operable to open said vent valve for restricted flow only when the pump's displacement is substantially zero.

2. The combination as claimed in claim 1 wherein the vent valve includes a seat and a closure member arranged to be urged onto the seat to close the valve by hydraulic pressure from the high pressure connection.

3. The combination as claimed in claim 2 wherein the said operative connection includes a compression spring whose loading increases to a maximum at zero displacement for lifting the closure member from the seat.

4. The combination as claimed in claim 3 wherein said spring is of the helical type and is arranged almost to close its coils at the zero displacement position to transmit a high force to the valve closure member.

5. The combination as claimed in claim 1 wherein the pump includes a rotary cylinder block and a pivoted yoke in which the cylinder block is mounted, pivotal movement of the yoke determining pump displacement, the valve is carried by the yoke and the operative connection comprises a fixed cam arranged to contact the valve during movement of the yoke through the zero displacement position.

6. The combination as claimed in claim 1 in which the pump is reversible in direction by movement of the adjusting means to opposite sides of the zero displacement position, wherein the pump includes a pair of liquid flow connections which alternatively form the high pressure and the return connections respectively and a pair of non-return valves connected one to each connection to select the connection at higher pressure and to which the high pressure duct to the vent valve is connected.

7. The combination as claimed in claim 1, wherein the vent valve includes a seat at the high pressure side, a closure member, spring means urging said closure member, in addition to the pressure, onto said seat, a plunger at the low pressure side of the seat, formed with an extension through the seat for contacting and unseating the closure member, and cooperating with the seat when the vent valve is open to define a restricted passage for liquid flow, and said vent-valve-opening means being arranged to move said plunger in the valve-opening sense when the pump is substantially in its zero-displacement position.

8. The combination as claimed in claim 7, including spring means arranged between the vent-valve-opening means and the plunger, opposing and of superior force to the spring means that urges the closure member onto its seat, to open the vent valve when the pressure also urging the same onto its seat has dropped substantially to zero.

9. In a hydraulic transmission, in combination with a positive displacement pump that is variable in displacement through a range that includes zero displacement, a motor, and passage means for supply of liquid from the pump to the motor, and return, means for adjusting the pump's displacement through such range, a duct interposed between the pressure supply passage and a low pressure region, a normally closed vent valve in said duct, means operatively connected to said displacement-adjusting means and arranged to open said vent valve when the pump is substantially in its zero displacement position, and means operatively arranged in said duct for allowing restricted flow only therethrough when said vent valve is open.

References Cited by the Examiner
UNITED STATES PATENTS

| | | | |
|---|---|---|---|
| 2,518,578 | 8/50 | Tomlinson | 103—161 |
| 2,550,966 | 5/51 | Buchanan | 103—161 |
| 2,614,500 | 10/52 | Tucker | 103—161 |
| 2,646,755 | 7/53 | Joy | 103—38 |
| 2,976,685 | 3/61 | Thoma | 60—53 |

LAURENCE V. EFNER, *Primary Examiner.*

JOSEPH H. BRANSON, JR., *Examiner.*